May 20, 1941.                R. R. POYNTER                2,242,922
              DISPOSAL APPARATUS FOR FALLEN LEAVES
                      Filed Dec. 18, 1939              2 Sheets-Sheet 1

INVENTOR.
Ralph R. Poynter,
BY
Hood & Hahn.
ATTORNEYS.

May 20, 1941.     R. R. FOYNTER     2,242,922
DISPOSAL APPARATUS FOR FALLEN LEAVES
Filed Dec. 18, 1939     2 Sheets-Sheet 2
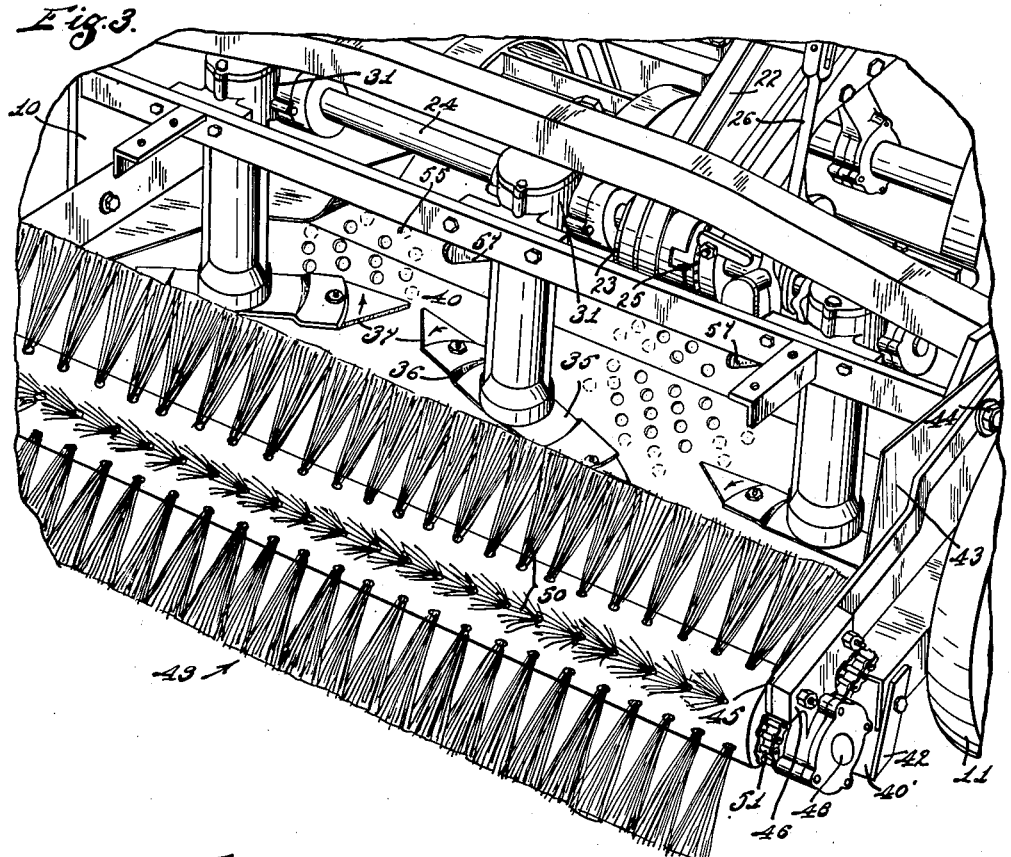
Fig. 3.
Fig. 4.
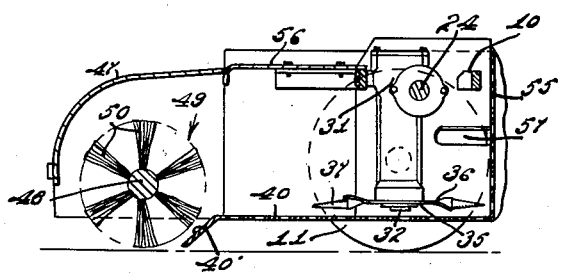
INVENTOR.
Ralph R. Poynter,
BY
Rood & Hahn.
ATTORNEYS.

Patented May 20, 1941

2,242,922

UNITED STATES PATENT OFFICE 2,242,922

DISPOSAL APPARATUS FOR FALLEN LEAVES

Ralph R. Poynter, Lebanon, Ind.

Application December 18, 1939, Serial No. 309,724

5 Claims. (Cl. 55—118)

Annually in this country in the late fall, tons of leaves from deciduous trees fall to the ground to be blown about by the winds until they disintegrate or to be removed and disposed of. If allowed to lie upon a lawn until disintegrated they smother the grass roots; if removed the underlying soil is robbed of renourishment; if burned as they lie, fire hazard is a considerable one, and underlying grass roots are many times destroyed.

The object of my present invention is to provide apparatus by means of which dead leaves may be picked up from the ground, broken into tiny bits, facilitating rapid disintegration under weather conditions, and promptly and automatically deposited, on the ground from whence they came, in such manner as to be practically invisible to casual observance and so that their remains will promptly fertilize the ground.

A further object of my invention is to so design parts that they may be applied to an existing type of lawn mower, wherein several cutters are carried at the lower ends of vertical high-speed shafts whereby, instead of a cutting action, the desired leaf-gathering, breaking and depositing action may be obtained.

The accompanying drawings illustrate an embodiment of my invention.

Fig. 3 is a perspective view of the parts shown in Fig. 2; and

Fig. 4 is a vertical section through the leaf-manipulating mechanism.

Figure 1:
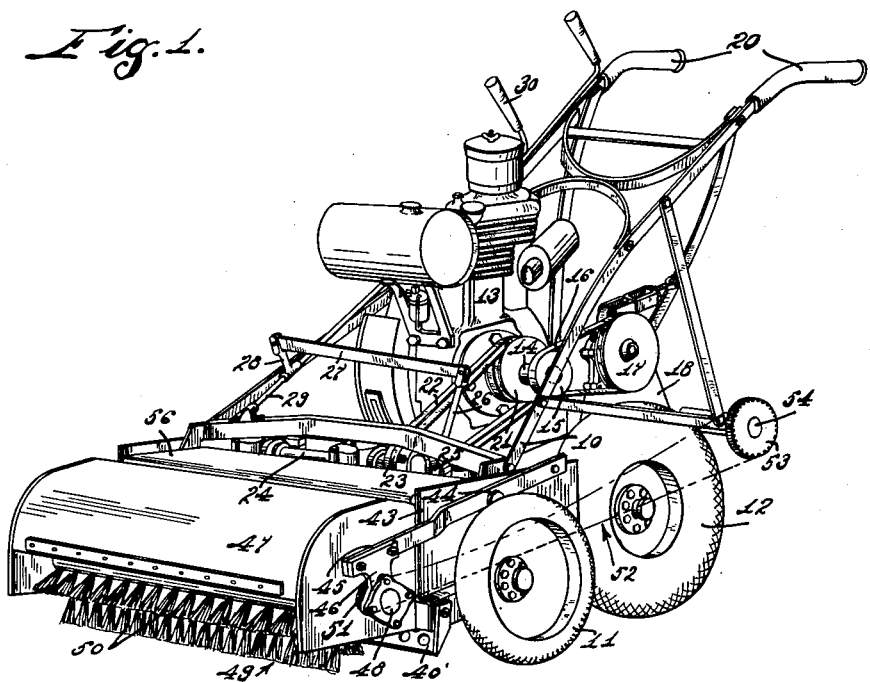
Fig. 1 is a perspective view of a complete machine.
Figure 2:
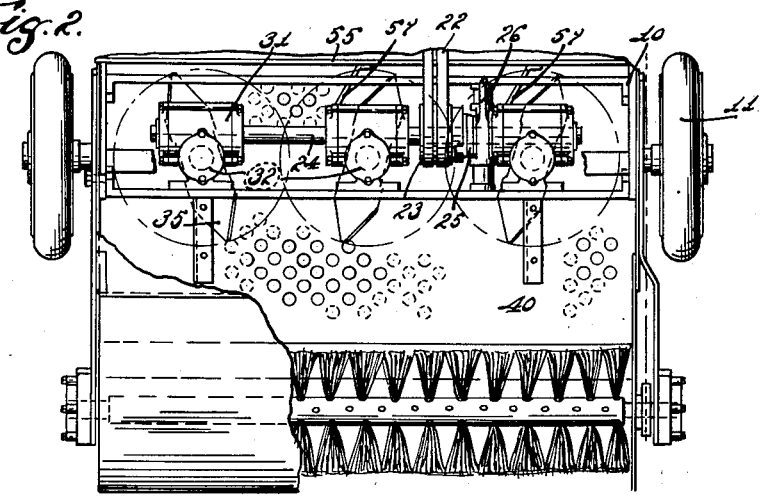
Fig. 2 is a plan of the leaf-manipulating mechanism with a portion of the top wall of the housing omitted.

In the drawings 10 indicates a main frame supported by suitable wheels 11 and 12. Mounted on frame 10 is a motor 13, conveniently of the gas-engine type having a power-delivery shaft 14 carrying a pulley 15 connected by belt 16 with pulley 17 which delivers through a suitable and well known transmission 18, to the rear wheels 12. The vehicle is guided by means of handles 20, 20 forming part of the main frame.

Shaft 14 carries a pulley 21 which is connected by belt 22 to a clutch pulley 23 mounted on a countershaft 24 journalled on the main frame. Also mounted on countershaft 24 and cooperating with the clutch pulley 23, is a clutch 25 controlled through the medium of lever 26, lever 27, lever 28, rockshaft 29, and lever 30, so that the countershaft may be connected to and disconnected from the motor.

Mounted on frame 10 are several shaft-and-gear housings 31 in which the countershaft 24 is journalled and in which are journalled a plurality of vertical shafts 32 connected with the countershaft by suitable gear pairs (not shown) conveniently of the spiral type.

Thus far the mechanism which has been described is well known. In that construction each of shafts 32 has attached to its lower end a horizontally placed disc which, at its periphery, carries a plurality of radially extending triangular cutter blades such as are commonly used as parts of the sickle bar of mowing machines commonly used for cutting hay.

For my present purposes, I remove the above-mentioned discs with their cutters and substitute therefor beater blades 35, the middle of each of which is flat and the opposite ends of which are oppositely slightly twisted about a horizontal axis as indicated at 36, thereby forming blades which, when rotated in the proper direction, as indicated by the arrows in Fig. 3, serve to create a down draft. To the opposite ends of the beater blades, I secure triangular cutters 37 of the type previously mentioned. These blades may be omitted, in which case the beater blades will be made somewhat longer and the formation is such that the ends of adjacent blades will clear each other as the blades are rotated. Closely beneath the blades 35, within a quarter of an inch or so, I mount, removably in frame 10, a perforated platform 40, the major portion of which is substantially horizontal and the forward end of which is inclined downwardly, as indicated at 40' in Fig. 4, so as to lie close to the ground. This edge is reinforced by a reinforcing bar 42.

At each side of the main frame, toward the rear of platform 40, I provide vertical housing plates 43, 43, and at each of these housing plates is pivoted, at 44, a lever 45, the forward end of each of which carries a bearing bracket 46. Secured to and extending between the forward ends of levers 45 is a brush housing 47 within which is mounted a horizontal shaft 48 which is journalled in the bearing brackets 46. Secured to shaft 48 within housing 47 is a horizontal brush 49, the hub of which is conveniently made in two halves clampable upon shaft 48 in a well known manner. Radially extending from the hub of brush 49 are several rows of stiff fiber 50 which are of sufficient length to contact the surface over which the apparatus is to be driven. These horizontal rows of radially extending fibers are conveniently six in number so that there will be considerable space, circumferentially of the brush, between the tips of adjacent rows of fibers, the arrangement being such that the tips of the fibers will penetrate a bed of fallen leaves behind a group or windrow of such leaves between the tips of the penetrating fibers and the forward edge of the platform 40.

Shaft 48 carries a sprocket wheel 51 which is connected by chain 52 with a sprocket wheel 53 carried by a shaft 54 rotatively connected with or forming a part of the transmission 18, the arrangement being such that, as the apparatus is advanced over the ground, the fibers at the lower side of the brush will move downwardly and rearwardly toward the forward downwardly inclined edge of platform 40 so as to sweep leaves from the ground up over platform 40 and over the beater blades 35.

Rising from the rear edge of platform 40 is a perforate vertical fence 55 which lies to the rear of countershaft 24. Between the upper edge of fence 55 and the rear side of housing 24 and between plates 43, 43 is a top housing plate 56.

In my present embodiment, the beater blades all rotate in the same direction and there is, therefore, a tendency of the leaves within the chamber where those blades are operating to move toward the left, in Fig. 3, between the housing 30 and fence 55 and toward the right between housing 30 and brush 49. In order to limit this movement to some extent and insure that the gathered leaves will remain within the zones of activity of the beater blades until the leaves are thoroughly broken, I mount, upon the forward face of fence 55, one or more baffle fingers 57.

In operation, as the apparatus is driven over the ground, the beater blades are rotated at a relatively high speed, while the brush 49 is rotated at a relatively low speed just sufficient to cause the leaves lying on the ground after engagement by the fibers of the brush to be driven upwardly and rearwardly into the beater compartment. Owing to the high speed of the beater blades and to their blower action, the fragile dead leaves which are delivered to the beater compartment are thoroughly broken up into relatively small pieces about the size of a finger nail or less, and these broken up particles, by reason of the air draft created by the beater blades, are driven downwardly out of the apparatus through the perforations of the platform 40 and movement of these leaf particles is such that, in the main, those particles are delivered edgewise downwardly so that they become nested between the blades of grass in edgewise positions. The broken leaf particles, because of their fractured edges and their vertical positioning between the blades of grass, are very readily permeable by moisture. As a consequence, I have found that whereas unbroken leaves may lie flat, closely adherent to the ground for several seasons before disintegration, the broken leaf particles produced by my apparatus disintegrate within the course of a few months.

In practice, I have found that a single passage of my mechanism over a surface heavily strewn with newly fallen dry leaves, will be entirely cleared of readily visible leaf portions so that the lawn will appear to be entirely free from leaves, although, as a matter of fact, the entire leaf crop has been redeposited on the ground closely adjacent the point at which they were lifted.

I claim as my invention:

1. Apparatus for disposing of fallen leaves, comprising a brush, a perforate platform arranged adjacent the brush to receive its discharge, means for actuating the brush to cause it to deliver leaves from the ground to said platform, means arranged in the discharge region of the brush over the perforations of the platform to engage leaves discharged by the brush and break them in small particles and to drive the broken particles downwardly through the perforations of the platform, and means for actuating said last-mentioned means at sufficient speed to cause breaking of leaves delivered thereto.

2. Apparatus for disposing of fallen leaves, comprising a brush, a perforate platform arranged adjacent the brush to receive its discharge, means for actuating the brush to cause it to deliver leaves from the ground to said platform, a beater blade arranged substantially in a horizontal plane above and closely adjacent the perforate platform and having its opposite ends so distorted as to form a blower blade, and means by which said blade may be rotated about a substantially vertical axis at a relatively high speed.

3. Apparatus for disposing of fallen leaves, comprising a vehicle with means for causing transport of said vehicle over the ground and carrying, a horizontal gang of associated leaf beating and blower elements capable of creating a downwardly directed steam of air, means by which said elements may be rotated at relatively high speed, a perforate platform arranged beneath said beater elements, and leaf engaging means associated with said beater elements and platform capable of delivering leaves from the ground to said beater elements.

4. Apparatus for disposing of fallen leaves, comprising a vehicle carrying, means for causing transport of said vehicle over the ground, a gang of associated leaf beating and blower elements, means by which said elements may be rotated at relatively high speed, a perforate platform arranged beneath said beater elements, a horizontal rotary brush associated with said beater elements in position to deliver leaves from the ground to said beater elements, and means for rotating said brush, and comprising a plurality of axially extending leaf-engaging elements which are substantially spaced circumferentially.

5. Apparatus for disposing of fallen leaves, comprising a wheel supported body carrying, a plurality of substantially vertical shafts arranged in a lateral gang and each provided, at its lower end, with a beater and blower blade, a perforated platform arranged closely beneath said beater and blower blades, a horizontally rotary brush arranged in advance of said beater-blower blades and adapted to deliver leaves from the ground to said blades over said platform, and power means connected to the vehicle wheels, the beater-blower blades and the brush to transport the vehicle at an appropriate speed over the ground, to rotate the brush at an appropriate speed to deliver leaves from the ground to the beater blades, and to actuate the beater blades at relatively high speed to cause breakage of leaves delivered thereto and delivery of the broken leaf particles downwardly through the perforated platform.

RALPH R. POYNTER.

CERTIFICATE OF CORRECTION.

Patent No. 2,242,922. May 20, 1941.

RALPH R. POYNTER.

It is hereby certified that error appears in the printed specification of the above numbered patent requiring correction as follows: Page 2, second column, lines 49 to 53 inclusive, claim 4, for "and means for rotating said brush, and comprising a plurality of axially extending leaf-engaging elements which are substantially spaced circumferentially." read --and comprising a plurality of axially extending leaf-engaging elements which are substantially spaced circumferentially, and means for rotating said brush.--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.